UNITED STATES PATENT OFFICE.

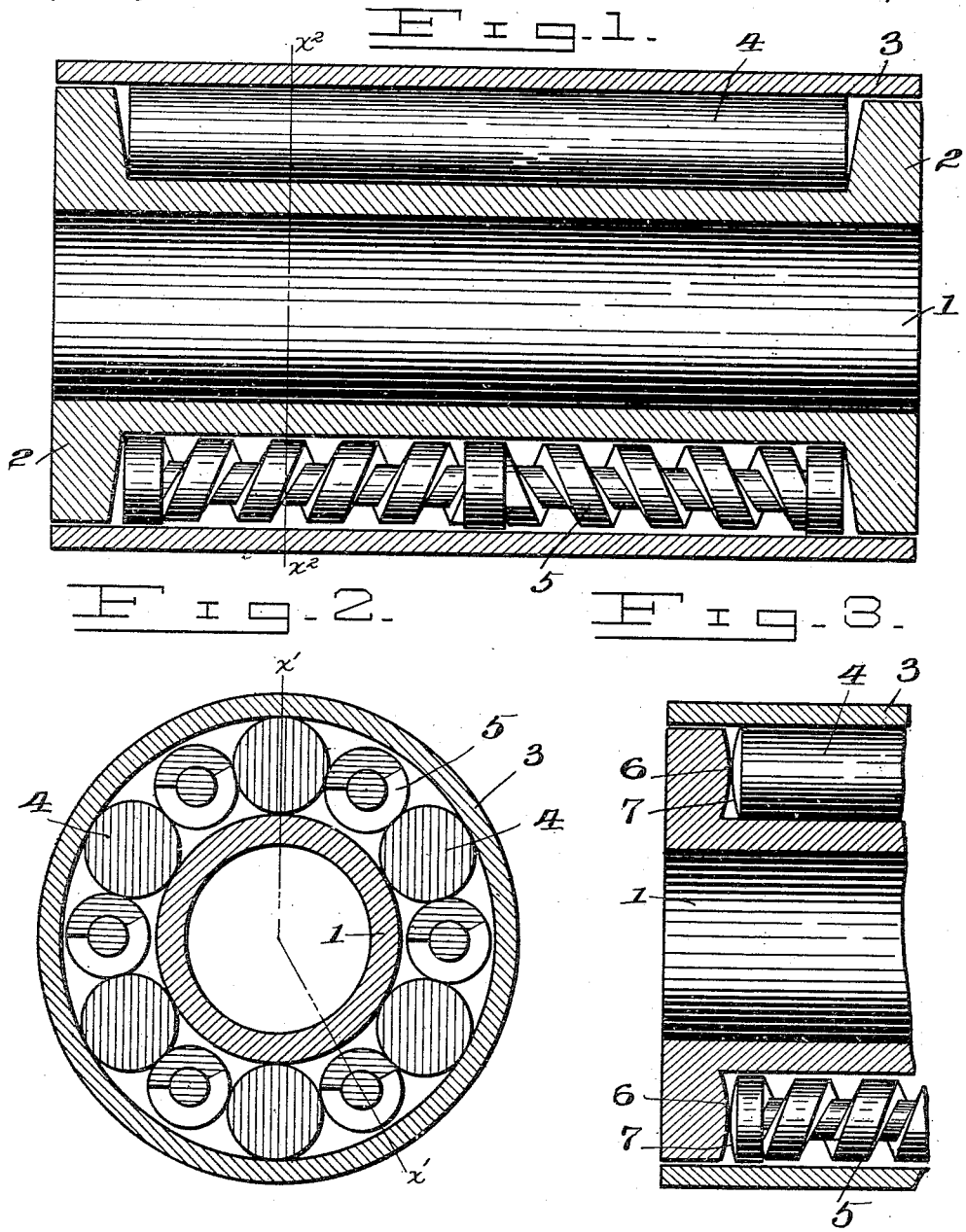

CHARLES R. HARRIS AND LOWELL W. LYONS, OF LOS ANGELES, CALIFORNIA, ASSIGNORS TO OVER ALL ROLLER BEARINGS COMPANY, OF LOS ANGELES, CALIFORNIA, A CORPORATION OF CALIFORNIA.

ROLLER-BEARING.

1,245,146.        Specification of Letters Patent.        Patented Oct. 30, 1917.

Application filed July 24, 1916. Serial No. 110,994.

*To all whom it may concern:*

Be it known that CHARLES R. HARRIS and LOWELL W. LYONS, citizens of the United States of America, residing at Los Angeles in the county of Los Angeles and State of California, have invented certain new and useful Improvements in Roller-Bearings, of which the following is a specification.

Our invention relates to an improvement in roller-bearings, and it consists in an inner and outer sleeve, the latter forming a housing, and the former of spool type, in connection with plain rollers and spiral rollers, with means at the ends to confine the rollers against end movement, and with a minimum of frictional contact.

It further consists in alternate plain and spiral rollers, with inner and outer sleeves, whereby to create a circulation of air in the bearings to keep the latter cool.

In the accompanying drawings:—

Figure 1 is a longitudinal sectional view on the line $x'$—$x'$ of Fig. 2;

Fig. 2 is a transverse section on the line $x^2$—$x^2$ of Fig. 1; and

Fig. 3 shows a slightly different form the invention might take.

The numeral 1 is the inner spool-shaped sleeve, which is preferably keyed or otherwise secured to the axle, and the inner surface of the ends 2 of which is chamfered; 3 is the outer sleeve which houses the bearing rollers. The numerals 4 indicate the plain bearing rollers and 5 the spiral bearing rollers, which are alternately arranged, the spiral portion of these idler rollers are of still smaller diameter than the ends and middle portions in order to permit a free circulation of air between the rollers, as shown in Fig. 2.

The ends of the plain bearing rollers 4 and the spiral bearing rollers 5 engage the inner ends of the chamfers 2 at their ends, thus reducing the end frictional contact to a minimum.

Practically the same result would be accomplished by the construction shown in Fig. 3, in which the spool formation of the inner sleeve is circumferentially convex, at 6, to engage a corresponding convex formation at 7 on the ends of the plain rollers and spiral bearing.

It is also obvious that all of the rollers might be straight or plain, instead of alternately straight and spiral, the fundamental idea being the minimum contact at the ends with the ends of the sleeve to reduce friction to the lowest possible point.

We claim:

1. A roller-bearing comprising an inner and outer sleeve, the inner sleeve being provided at its ends with flanges, and alternately-arranged straight bearing rollers and spiral idle rollers, the spiral idlers having end and intermediate bearing surfaces thereon of slightly larger diameter than the spiral portions, whereby friction is reduced to a minimum and free circulation of air is permitted around the idlers.

2. A roller-bearing comprising inner and outer sleeves, the inner sleeve being provided at its ends with flanges having their inner walls tapering outwardly, and alternately arranged straight bearing-rollers and spiral idle rollers, the spiral idlers having bearing surfaces at the ends thereof in contact with the base of the slanting wall portions of the flanges of the inner sleeve, whereby friction is reduced to a minimum and a free circulation of air is permitted around the idlers.

In testimony whereof we affix our signatures.

CHARLES R. HARRIS.
LOWELL W. LYONS.

Copies of this patent may be obtained for five cents each, by addressing the "Commissioner of Patents, Washington, D. C."